(12) United States Patent
Blair et al.

(10) Patent No.: US 6,771,448 B2
(45) Date of Patent: Aug. 3, 2004

(54) TENSION/COMPRESSION COMPLIANT LINK FOR CARTRIDGE LOADING APPARATUS

(75) Inventors: John Ray Blair, Tucson, AZ (US); David Michael Davis, Tucson, AZ (US); William David Lamear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 10/035,449

(22) Filed: Jan. 4, 2002

(65) Prior Publication Data

US 2003/0128455 A1 Jul. 10, 2003

(51) Int. Cl.[7] .......................... G11B 15/18; G11B 17/00; G11B 19/02
(52) U.S. Cl. ............................. 360/69; 360/88; 360/92; 242/338.4
(58) Field of Search ............................. 360/69, 88, 92; 242/181, 338.4

(56) References Cited

U.S. PATENT DOCUMENTS

| | | | | |
|---|---|---|---|---|
| 3,811,625 A | * | 5/1974 | Harford et al. ............. 242/181 |
| 4,772,968 A | * | 9/1988 | Nonaka et al. ............... 360/92 |
| 5,264,974 A | * | 11/1993 | Campbell et al. ............. 360/92 |
| 5,717,681 A | * | 2/1998 | Osada ........................ 369/178 |
| 5,872,765 A | * | 2/1999 | Osada ........................ 369/178 |
| 5,936,795 A | * | 8/1999 | Theobald et al. ............. 360/92 |
| 6,094,321 A | * | 7/2000 | Pollard ........................ 360/92 |
| 6,204,992 B1 | * | 3/2001 | Rockwell ..................... 360/92 |

* cited by examiner

Primary Examiner—David Hudspeth
Assistant Examiner—Jason Olson
(74) Attorney, Agent, or Firm—John H. Holcombe

(57) ABSTRACT

A cartridge loading apparatus has at least one movable member with a pin to engage a notch of a cartridge and has a reversible motor. A compliant link has a longitudinal leaf spring resilient beam, and has a laterally extending arm at one end of the beam, forming an "L" shape. The movable member and the motor apparatus are coupled at axes respectively at the other end of the beam and at an end of the arm. Thus, a compression force provides a rotational torque at the arm which flexes the beam outwardly away from a straight line between the axes; and a tension force provides a rotational torque to flex the beam inwardly.

26 Claims, 8 Drawing Sheets

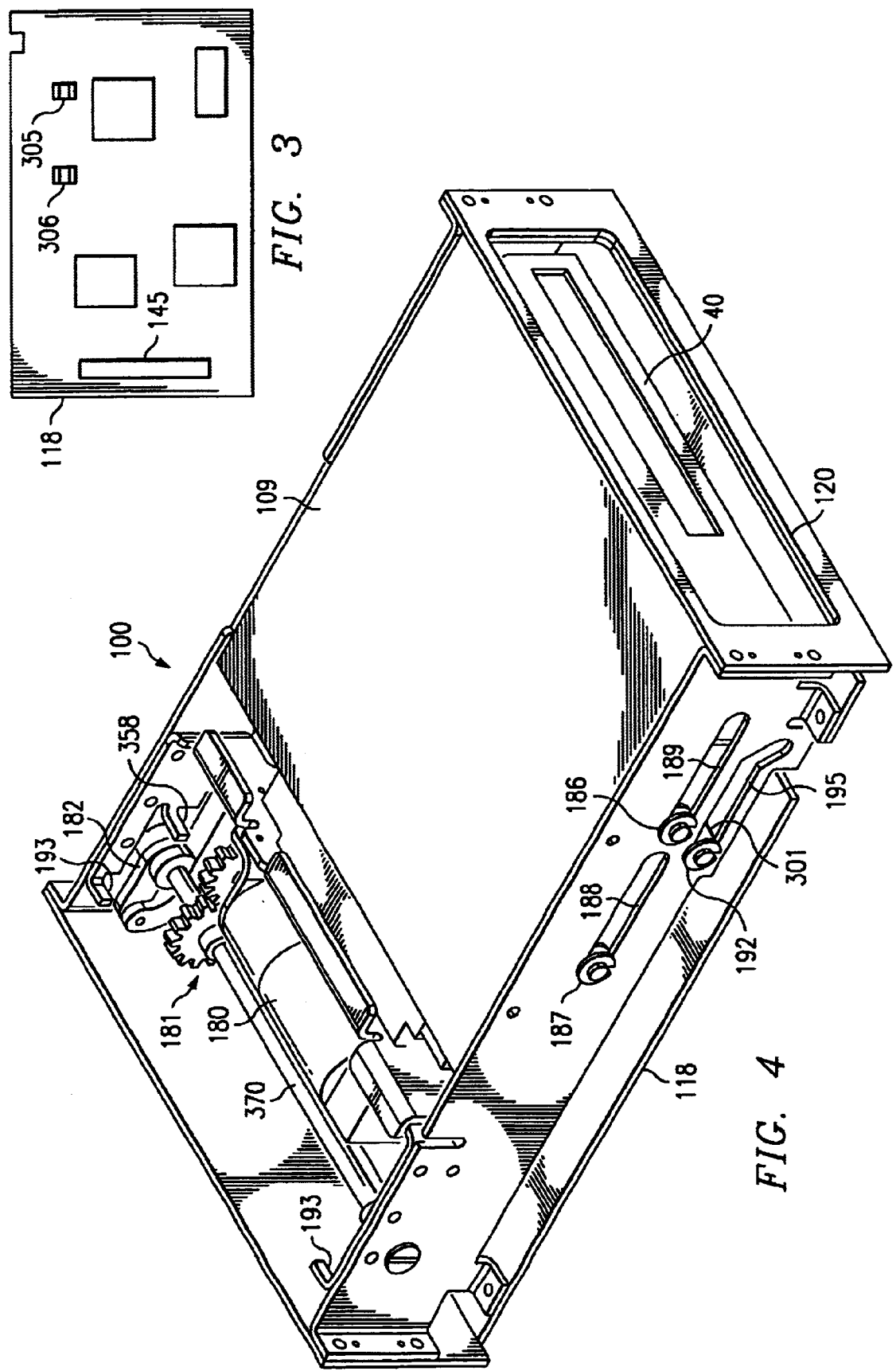

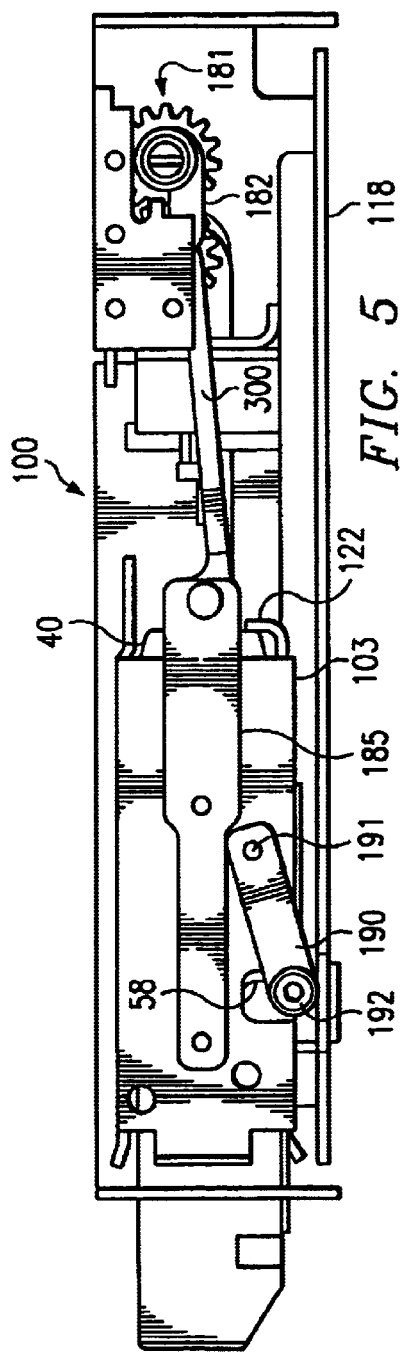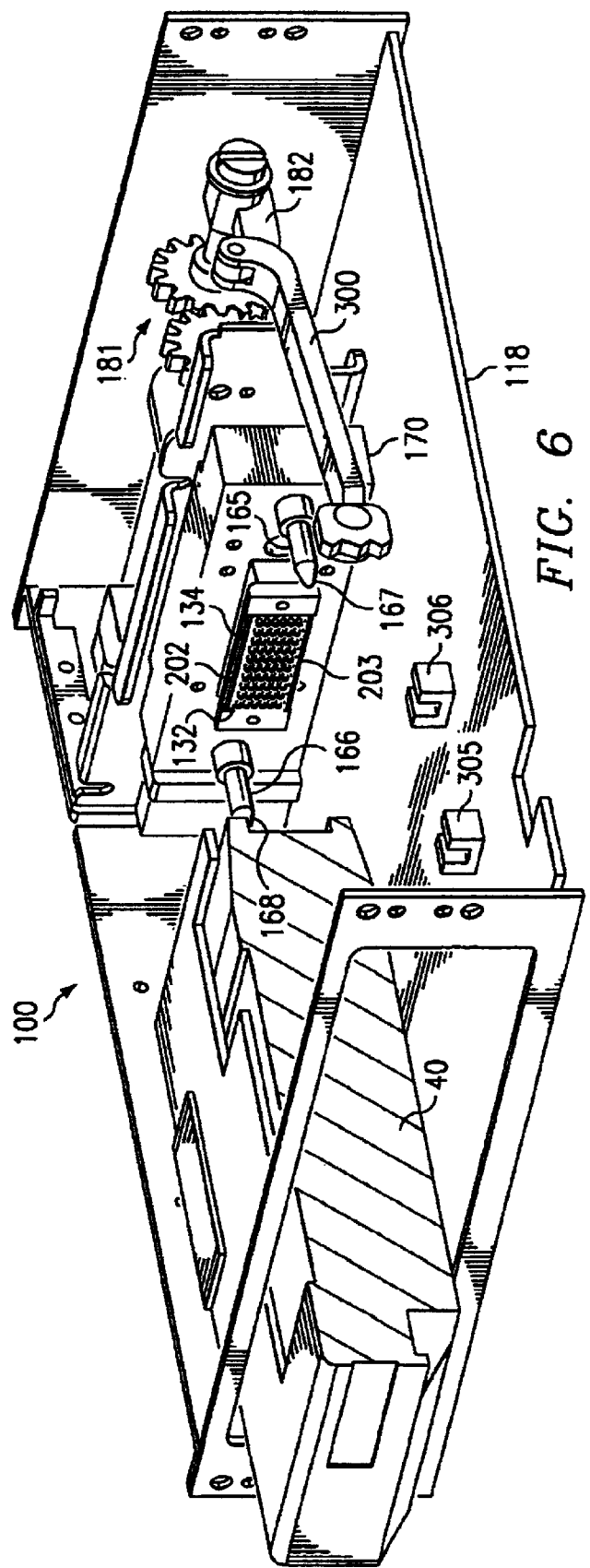

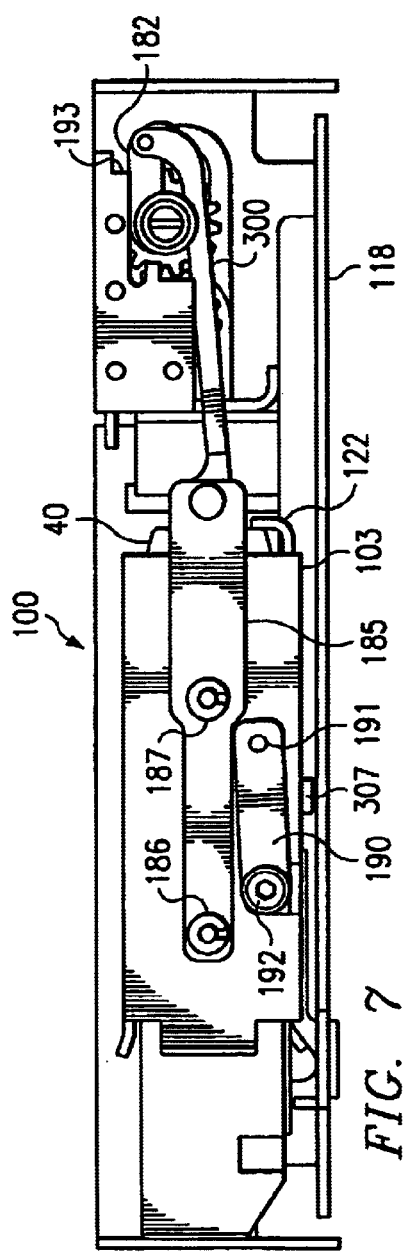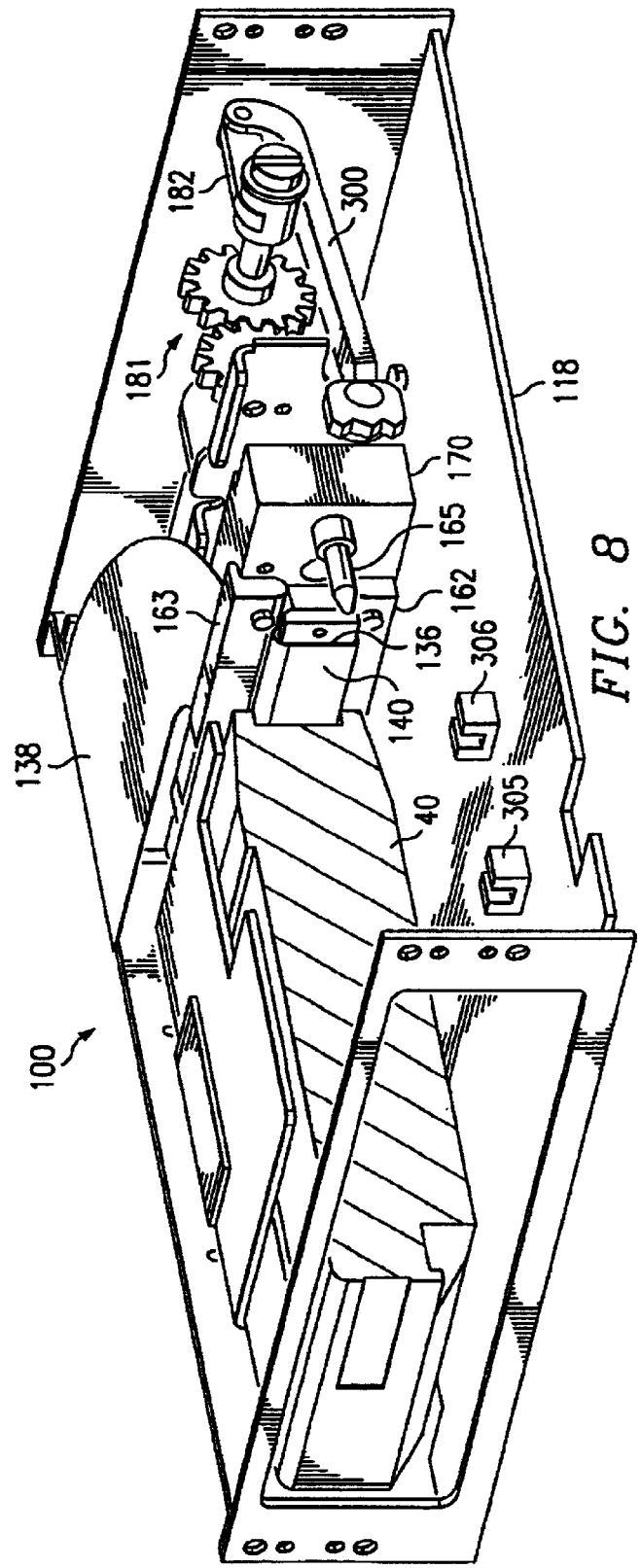

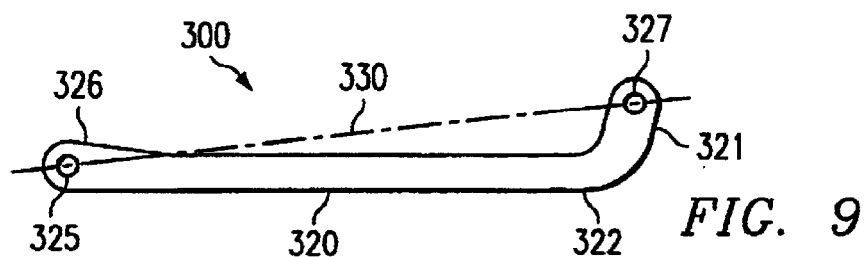
FIG. 9
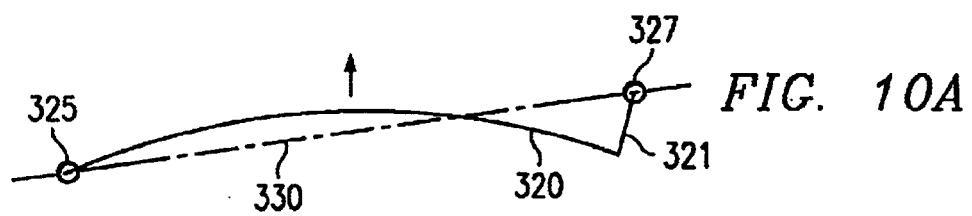
FIG. 10A
FIG. 10B
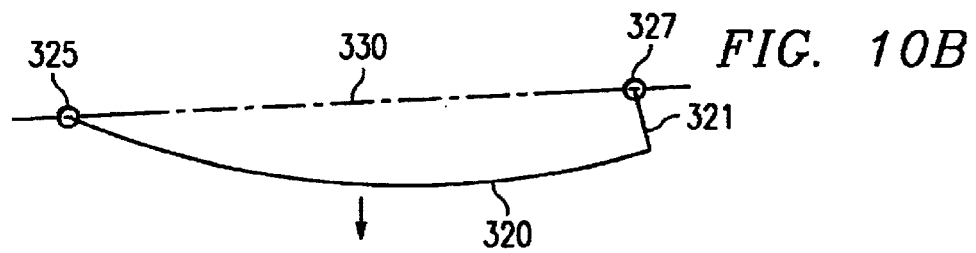
FIG. 11
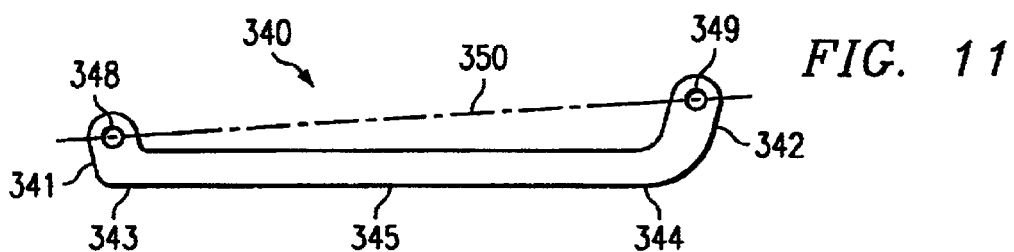
FIG. 12A
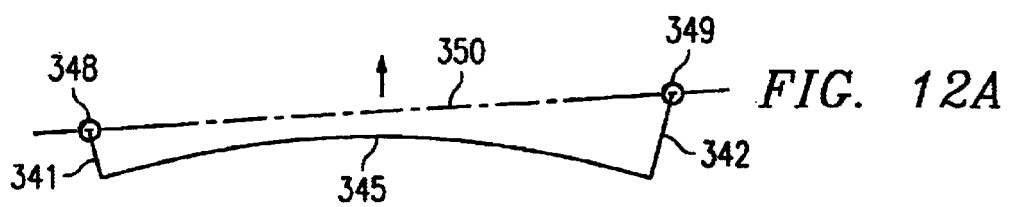
FIG. 12B
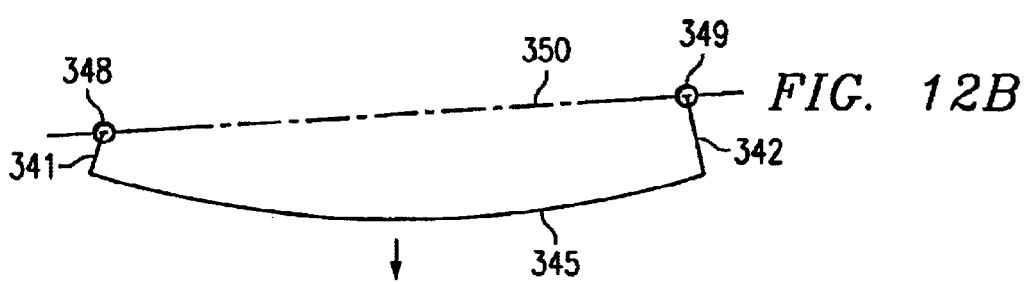

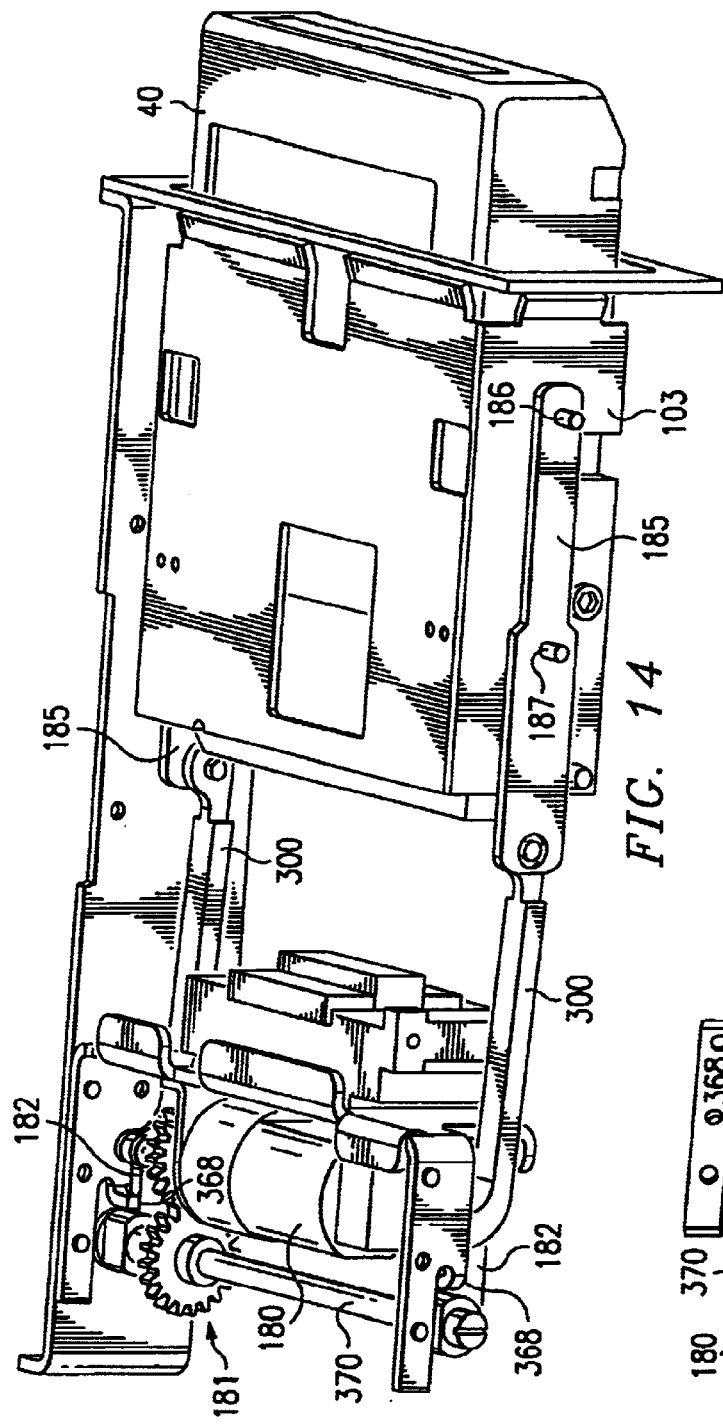
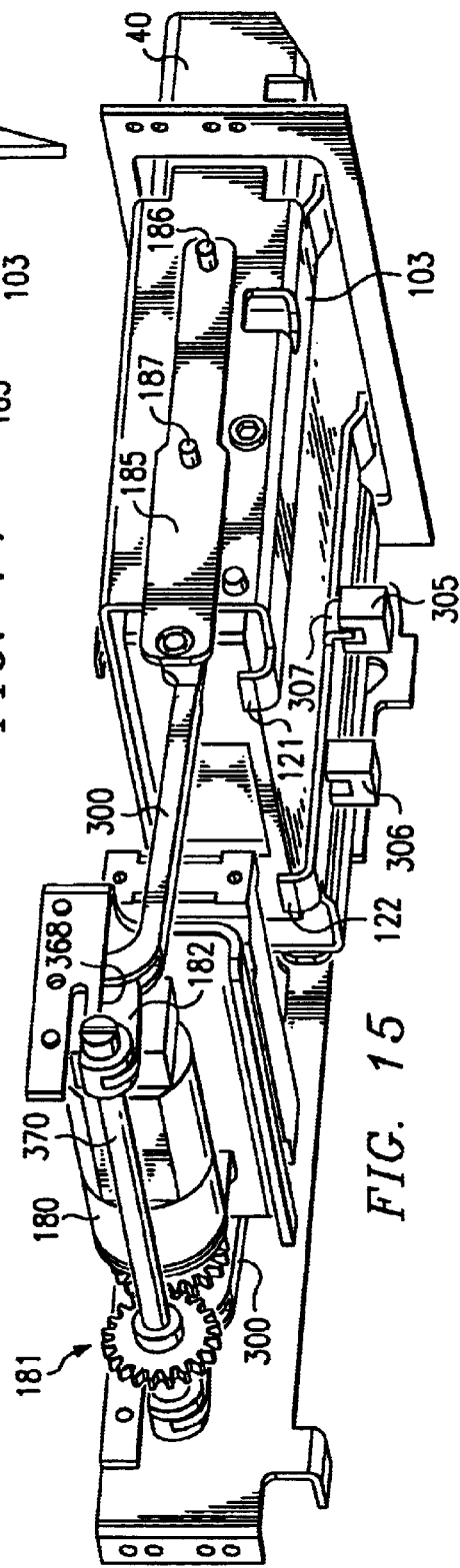

TENSION/COMPRESSION COMPLIANT LINK FOR CARTRIDGE LOADING APPARATUS

DOCUMENT INCORPORATED BY REFERENCE

Commonly assigned U.S. patent application Ser. No. 09/842,030, filed Apr. 26, 2001, is incorporated for its showing of, inter alia, a cartridge loading apparatus.

FIELD OF THE INVENTION

This invention relates generally to the field of cartridge loading apparatus, and, more specifically, to the motorized loading and/or unloading of data storage cartridges or cassettes from data storage drives or stations.

BACKGROUND OF THE INVENTION

Cartridge loading apparatus for data storage cartridges or cassettes may be employed with automated data storage libraries, with multi-cartridge magazines, and with single cartridge mechanisms, and to accept manually provided cartridges. Cartridges may, for example, comprise a single reel wound with magnetic tape, dual reel cassettes of magnetic tape, one or more optical disks, magnetic disks or disks mounted on a rotatable shaft, completely encased magnetic disk drives, etc. Herein, all are termed "cartridges".

Such cartridge loading apparatus is typically expected to properly position the cartridge, and to provide the necessary pressure(s) to properly place and hold the cartridge, both as loaded and in position for unloading.

Hence, loaders are typically complex and precision mechanisms. U.S. Pat. No. 5,264,974 shows a cassette loading system with a motor and a plurality of cassette drive wheels and an engagement assembly. The patent shows a cassette drive wheel gear train, timing belt, and orientation sensor, and an engagement assembly with an engagement solenoid, two link plates having a narrow slot fixed to the solenoid piston, each with a bell crank rotatably attached to the link plate, a swing arm to which a drive wheel is rotatably mounted, and planetary gear shaft extending through the narrow slot so that the shaft is free to slide within the slot on the link plate. U.S. Pat. No. 3,811,625 shows a cassette-engaging structure with spaced apart jaws to engage the cartridge, one jaw including an extension which receives guide pins from a parallel gripping beam operated through a bell crank by a solenoid, and a spring is provided to release the cartridge upon deenergization of the solenoid. The positioning of the cassette is accomplished by a mechanism with a locking arm supported on a vertical pivot pin and another solenoid swings the arm to the tape deck, and is operated by a motor coupled through a pulley-belt apparatus to a rotatably mounted shaft with a Geneva movement and an axial cam, and employs shafts, pins, slots, riding surfaces, cams and springs.

Loading mechanisms for automated data storage libraries have the additional need to withstand impacts and pushing or pulling actions by the mechanism providing the cartridge to the loader. This is typically accomplished by providing restraint mechanisms with unidirectional springs (tension or compression) and/or by maintaining energization of the motor of the loader to hold the cartridge in a desired position when loaded. When a receiver for the cartridge is positioned in an unloaded position to allow the removal or delivery of a cartridge, typically no spring is provided, and the receiver for the cartridge is subject to creep, and may not be in the precisely correct position to accept a cartridge being delivered, requiring a level of "hunting", or extra insertion effort by the delivering mechanism.

Restraining mechanisms for cassettes, respectively in a magazine and in a storage shelf, are shown in U.S. Pat. Nos. 5,936,795, and 4,772,968 with unidirectional bias springs and detents. Forces in the direction not offset by the bias of the springs are directly transmitted between the cassettes and the mechanism.

SUMMARY OF THE INVENTION

An object of the present invention is to provide a more simplified mechanism for a cartridge loading apparatus.

Another object of the present invention is to provide an apparatus tending to lock an engaged cartridge at a fully loaded position.

A compliant linkage is disclosed for a cartridge loading apparatus. The cartridge loading apparatus has at least one movable member for moving an engaged cartridge. One example is an arm with a pin which engages a notch of a cartridge. A reversible motor apparatus operates the cartridge loading apparatus.

The compliant linkage comprises at least one compliant link which has a longitudinal leaf spring resilient beam, and an arm extending laterally of the longitudinal beam in a direction such that rotational torque at the laterally extending arm tends to flex the longitudinal beam. The laterally extending arm is positioned towards a first end of the beam, forming, in one example, an "L" shape.

The longitudinal beam has a coupling axis toward a second end of the longitudinal beam opposite the first end; and the laterally extending arm has a coupling axis spaced from the longitudinal beam. The beam coupling axis and the arm coupling axis are parallel to each other and perpendicular to a plane formed by the longitudinal beam and the laterally extending arm. The compliant link is coupled to the movable member and to the reversible motor apparatus at respective ones of the coupling axes.

In this manner, application of a compression force to the compliant linkage provides a rotational torque at the laterally extending arm, which tends to reduce the distance between the coupling axes and to flex the longitudinal beam outwardly in a direction away from a straight line between the coupling axes; and application of a tension force to the compliant linkage provides a rotational torque at the laterally extending arm tending to increase the distance between the coupling axes and to flex the longitudinal beam inwardly in a direction towards a straight line between the coupling axes.

In another embodiment, the compliant link has two laterally extending arms, each at opposite ends of the longitudinal leaf spring resilient beam, in one example, forming a "U" shape. The coupling axes are spaced from the longitudinal beam such that the compression force and tension force provide the respective rotational torque.

In a further embodiment, a rotatable mechanism is coupled to the reversible motor apparatus, which is rotatable to an over-center position which is beyond the point at which the least one movable member and the at least one compliant link are moved to a fully loaded position at which an engaged cartridge is fully loaded at the receptacle. A "loaded" limit stop limits movement of the cartridge loading apparatus at the over-center position of the rotatable mechanism, such that a compression relationship is provided between the receptacle and an engaged fully loaded cartridge, which generates a tension force on the compliant link and tends to force the cartridge loading apparatus against the "loaded" limit stop, thereby tending to lock the engaged cartridge at the fully loaded position.

For a fuller understanding of the present invention, reference should be made to the following detailed description taken in conjunction with the accompanying drawings.

BRIEF DESCRIPTION OF THE DRAWINGS

FIG. 3 is a plan view illustration of an example of a PCB mounting sensors for detecting a tab of the cartridge loading apparatus of FIG. 2;

FIG. 4 is an alternative isometric view of the cartridge loading apparatus of FIG. 2, with a loaded cartridge of FIG. 1;

FIG. 5 is a side view cut away illustration of the cartridge loading apparatus of FIG. 2 illustrating the loading mechanism in an unloaded position;

FIG. 6 is a cut away illustration of the cartridge loading apparatus of FIG. 2 and of a cartridge of FIG. 1 with the loading mechanism in an unloaded position;

FIG. 7 is a side view cut away illustration of the cartridge loading apparatus of FIG. 2 illustrating the loading mechanism in a loaded position;

FIG. 8 is a cut away illustration of the cartridge loading apparatus of FIG. 2 and of a cartridge of FIG. 1 with the loading mechanism in a loaded position;

FIG. 9 is a side view illustration of one embodiment of a compliant link of the present invention, which may be employed with the cartridge loading apparatus of FIGS. 2–8;

FIGS. 10A and 10B are diagrammatic representations of the functioning of the compliant link of FIG. 9;

FIG. 11 is a side view illustration of an alternative embodiment of a compliant link of the present invention, which may be employed with the cartridge loading apparatus of FIGS. 2–8;

FIGS. 12A and 12B are diagrammatic representations of the functioning of the compliant link of FIG. 11;

FIG. 14 is an upper isometric view, and

FIG. 15 is a lower isometric view, both illustrating the complaint linkage and rotatable mechanism of the cartridge loading apparatus of FIG. 2 in an unloaded and over-center position;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
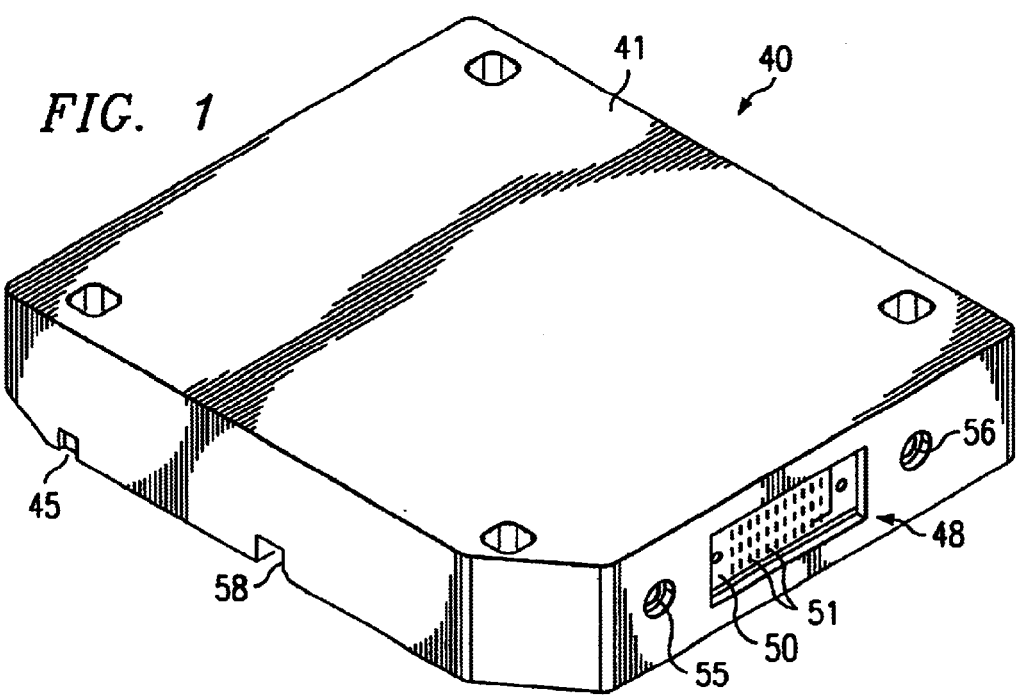
FIG. 1 is an isometric view of an example of a data storage cartridge usable with a cartridge loading apparatus in accordance with the present invention.

Referring to FIG. 1, an example of a data storage cartridge is illustrated. Data storage cartridges or cassettes (herein collectively called "cartridges") may contain any one of various types of storage media or devices. As one example, a cartridge may comprise a single reel wound with magnetic tape, which would be wound onto a take-up reel in a tape drive. As another example, a cartridge may comprise dual reels supporting a length of magnetic tape, and a door would be opened to allow an interface with a tape head of a tape drive. A further cartridge may comprise one or more optical disks, which would be loaded into an optical drive. Other cartridges comprise magnetic disks, such as flexible disks, or comprise rigid disks mounted on a rotatable shaft, which would be inserted into a disk drive and sealed. Another type of cartridge comprises a completely encased magnetic disk drive or other storage device, such as that illustrated in the incorporated '030 Patent Application.

The example of a cartridge of the '030 Patent Application is illustrated in FIG. 1, and comprises a data storage cartridge 40 having a cartridge shell 41. The cartridge has a similar exterior form factor as that of a single reel tape cartridge. A notch 45 is provided to interlock with a holder in a storage shelf of an automated data storage library which tends to hold the data storage cartridge in position in the shelf, and a similar notch is provided on the opposite side of the cartridge.

The cartridge shell 41 mounts a data handling agent, such as a data storage device, therein, and an external data transfer interface electrical connector 48 is provided, incorporating a substrate 50, having electrical contacts 51 on a facing surface of the substrate. The electrical contacts 51 are coupled to the data handling agent, and are arranged to match electrical contacts of a data transfer station, when in a face-to-face relationship.

Alignment, or registration, holes 55 and 56 are provided and mate with corresponding alignment pins of the cartridge loading apparatus to laterally align and register the data transfer interface of the portable cartridge 40 with a data transfer interface of the data transfer station.

In the above example of a cartridge, which mates with a data transfer station, and other cartridges, which mate with tape, optical, or disk drives, each requires that the cartridge is properly positioned with the necessary pressure(s) to properly place and hold the cartridge, both as loaded and in position for unloading. A cartridge loading apparatus accomplishes these functions.

The cartridge loading apparatus engages the cartridge, for example, at a notch 58 in the cartridge, and a similar notch at the opposite side of the cartridge. Typically, the notches 58 are symmetrically located on opposite sides of the cartridge 40 to provide symmetrical forces to the opposite sides of the cartridge and prevent the cartridge from skewing. In the example of the cartridge of the '030 Patent Application, the cartridge loading apparatus engages the portable data storage cartridge 40 to provide a force normal to the electrical contacts 51 of the data transfer interface electrical connector 48, so that they provide non-wiping contact with matching electrical contacts of the cartridge loading apparatus.

FIGS. 2–19 illustrate an embodiment of cartridge loading apparatus 100 and various components, and their operation. The cartridge loading apparatus may be employed with a data transfer station or a data storage drive, as discussed above.

Referring to FIGS. 2–8, the cartridge loading apparatus 100 comprises a receiver 103 for receiving the portable data storage cartridge 40. The cartridge may be received manually, may be received from a multi-cartridge magazine, may be received from a robot accessor of an automated data storage library, or may be received from an automated cartridge loader (ACL), as is known to those of skill in the art.

Figure 2:
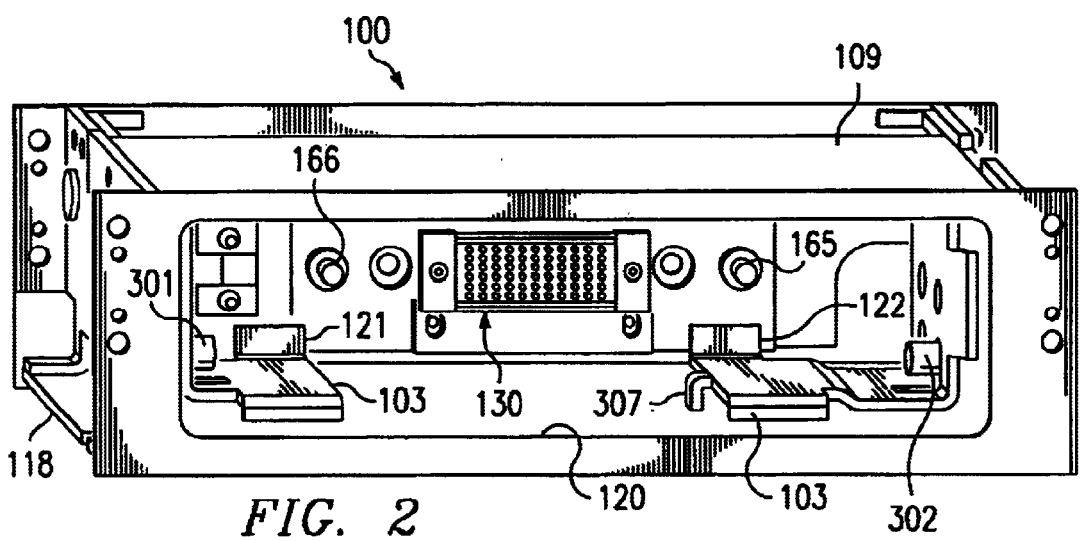
FIG. 2 is an isometric view of a cartridge loading apparatus which may implement the present invention for loading and unloading the cartridge of FIG. 1.

The cartridge loading apparatus may comprise a top plate 109, a printed circuit board (PCB) 118, and a receiving slot 120 into which the cartridge is inserted. Referring to FIG. 2, the receiver 103 is moved toward and away from a receptacle 130 by means of the compliant linkage of the present invention, employing pins 301 and 302 to engage slots 58 in the sides of the cartridge 40 of FIG. 1. Referring additionally to FIGS. 3–8, in accordance with an aspect of the present invention, sensors 305 and 306 mounted, for example, on the PCB 118, comprise end of motion sensors which detect a tab 307 of the cartridge loading apparatus of FIG. 2 when the receiver 103 is respectively in the unloaded position or in the loaded position. Sensors 305 and 306 may comprise both an optical source and receiver, such as an infrared source, e.g., an LED optical source, which is focused, providing a focused beam directed toward the receiver, and an infrared optical sensor. The sensors detect presence of the tab 307 by blockage of the beam. Alternatively, magnetic sensors may be employed to detect the presence of the metal tab 307. Electronic components of the cartridge loading apparatus may be mounted on the same side of the PCB 118 as sensors 305 and 306 as shown, or alternatively may be mounted on the reverse side of the PCB.

Specifically, unloaded end of motion sensor 305 detects tab 307 when the receiver 103 is in the unloaded position, and loaded end of motion sensor 306 detects tab 307 when the receiver 103 is moved to a fully loaded position at which an engaged cartridge is fully loaded. As will be discussed, the end of motion sensors are employed to operate a motor 180 and lock the receiver 103, respectively, in the unloaded and loaded positions. As is understood by those of skill in the art, alternative locations may also be employed for mounting the sensors and tab or other indicator of receiver position.

The incorporated '030 Patent Application shows the receptacle 130 as comprising (FIG. 6) an elastomeric compression element 132 having a plurality of protruding compression members supported by a reference plate 134. The compression element is positioned (FIG. 8) at a rear surface of a circuitized flexible substrate 136, which may comprise a termination of a flex cable 138. The circuitized flexible substrate 136 has electrical contacts on a facing surface 140 thereof, the electrical contacts arranged to match the (FIG. 1) portable cartridge electrical contacts 51 when in a face-to-face relationship. The flexible substrate may be coupled to connector 145 of the PCB 118 of FIG. 3.

The cartridge loading apparatus of the present invention exerts a force on the portable cartridge normal to the facing surface 140, compressing the elastomeric compression element 132 between the matching circuitized flexible substrate 136 and the reference plate 134. This creates a non-wiping contact between the electrical contacts 51 of the portable cartridge substrate 50 of FIG. 1 and the electrical contacts 141 of the matching circuitized flexible substrate 136, thereby forming a releasable, repeatable electrical connection therebetween.

The incorporated '030 Patent Application additionally shows alignment pins 165 and 166 for mating with respective registration holes 55 and 56 of the portable data storage cartridge 40 of FIG. 1 to register the external data transfer interface electrical connector 48 with receptacle 130. Both alignment pins are aligned substantially normal to the facing surface 140 of the matching circuitized flexible substrate 136, and are tapered at the ends 167 and 168, respectively, to a rounded point in the direction of the portable cartridge substrate 50 to orient the portable cartridge substrate and gradually laterally align the portable cartridge substrate and the matching circuitized flexible substrate 136.

For the purpose of the present invention, alternative couplings may be made with respect to the portable cartridge 40, and, further, the present cartridge loading apparatus may be employed with other types of devices or drives for loading other types of cartridges. As discussed above, data storage cartridges may contain any one of various types of storage media or devices, including one or two reels for supporting magnetic tape for engagement with a tape drive. The cartridge may comprise one or more optical disks loaded into an optical drive. Other cartridges comprise magnetic disks, such as flexible disks, or comprise rigid disks mounted on a rotatable shaft, which would be loaded into a disk drive.

Referring to FIGS. 2–8, an embodiment of a cartridge loading apparatus 100 is illustrated which a portable data storage cartridge for a receptacle 130. FIGS. 5 and 6 illustrate the receiver 103 at the unloaded end of motion, also called an "insert" position, and with a cartridge 40 in the receiver 103 at the stops (only stop 122 is shown). FIGS. 4, 7 and 8 illustrate the receiver 103 at the loaded end of motion, where the portable data storage cartridge is pushed against the receptacle 130.

A compliant linkage is disclosed for a cartridge loading apparatus. The cartridge loading apparatus has at least one movable member for moving an engaged cartridge. One example is an arm with a pin which engages a notch of a cartridge. A reversible motor apparatus operates the cartridge loading apparatus.

The compliant linkage of the present invention comprises at least one compliant link 300. As will be discussed, the compliant link has a longitudinal leaf spring resilient beam, and at least one arm extending laterally of the longitudinal beam in a direction such that rotational torque at the laterally extending arm tends to flex the longitudinal beam, to serve as a resilient beam both for the application of a compression force and for the application of a tension force.

In the illustrated embodiment, the loading mechanism is initially at an "insert" position with motor 180 having operated through gear train 181 to rotate bell crank 182 toward the front of the cartridge loading apparatus 100. Bell crank 182 has thus pushed the compliant link 300 toward the front of the cartridge loading apparatus, which pushed arm 185 of receiver 103, and therefore the receiver 103, towards the front opening 120 of the cartridge loading apparatus. A similar bell crank 182, compliant link 300 and arm 185 are provided on the other side of the receiver 103, and have been cut away to show guides 186 and 187 of the arms 185 which ride in slots 188 and 189 of the cartridge loading apparatus and movably support the receiver 103 as it moves forward and backwards. Engagement arms 190 are attached to the receiver 103 at pivots 191, and each includes a guide 192 which moves in slots 195 of the cartridge loading apparatus. As is understood by those of skill in the art, the guides, arms, beams and slots are the same on each side of the receiver 103. Also as is understood by those of skill in the art, differing arrangements of guides, arms, beams and slots may be employed in accordance with the present invention.

Referring to FIG. 9, one embodiment of a compliant link 300 of the present invention is illustrated, which may be employed with the cartridge loading apparatus of FIGS. 2–8. FIGS. 10A and 10B are diagrammatic representations of the functioning of the compliant link of FIG. 9.

The compliant link 300 comprises a longitudinal leaf spring resilient beam 320, and an arm 321 extending laterally of the longitudinal beam 320 in a direction such that rotational torque at the laterally extending arm tends to flex the longitudinal beam. The laterally extending arm is positioned towards a first end 322 of the beam, forming, in one example, an "L" shape.

The longitudinal beam 320 has a coupling axis 325 toward a second end 326 of the longitudinal beam opposite the first end; and the laterally extending arm 321 has a coupling axis 327 spaced from the longitudinal beam. The beam coupling axis 325 and the arm coupling axis 327 are parallel to each other and perpendicular to a plane formed by the longitudinal beam 320 and the laterally extending arm 321. In the embodiment of the cartridge loading apparatus of FIGS. 2–8, the compliant link is coupled to a movable member (arm 185) and to the reversible motor apparatus (bell crank 182) at respective ones of the coupling axes.

Referring additionally to FIGS. 10A and 10B, FIG. 10A shows application of a tension force to the compliant linkage, and FIG. 10B shows application of a compression force to the compliant linkage. In FIGS. 9 and 10A, the application of a tension force to the compliant linkage provides a rotational torque at the laterally extending arm 321 tending to increase the distance between the coupling axes 325 and 327, and to flex the longitudinal beam 320 inwardly in a direction towards a straight line 330 between the coupling axes. In FIGS. 9 and 10B, application of a compression force to the compliant linkage provides a rotational torque at the laterally extending arm 321, which tends to reduce the distance between the coupling axes 325 and 327, and to flex the longitudinal beam 320 outwardly in a direction away from the straight line 330 between the coupling axes.

Another embodiment of a compliant link is illustrated in FIGS. 11, 12A and 12B. In the alternative embodiment, the compliant link 340 has two laterally extending arms 341, 342, each at opposite ends 343, 344 of the longitudinal leaf spring resilient beam 345, in one example, forming a "U" shape. The coupling axes 348, 349 are spaced from the longitudinal beam 345 such that the compression force and tension force provide the respective rotational torque. Specifically, the arm coupling axes 348, 349 are parallel to each other and perpendicular to a plane formed by the longitudinal beam 345 and the laterally extending arms 341, 342. In the embodiment of the cartridge loading apparatus of FIGS. 2–8, the compliant link 340 is coupled to the movable member (arm 185) and to the reversible motor apparatus (bell crank 182) at respective ones of the coupling axes.

Again, FIG. 12A shows application of a tension force to the compliant linkage, and FIG. 12B shows application of a compression force to the compliant linkage. In FIGS. 11 and 12A, the application of a tension force to the compliant linkage provides a rotational torque at the laterally extending arms 341, 342, tending to increase the distance between the coupling axes 348 and 349, and to flex the longitudinal beam 345 inwardly in a direction towards a straight line 350 between the coupling axes. In FIGS. 11 and 12B, application of a compression force to the compliant linkage provides a rotational torque at the laterally extending arms 341, 342, which tends to reduce the distance between the coupling axes 348 and 349, and to flex the longitudinal beam 345 outwardly in a direction away from the straight line 350 between the coupling axes.

Thus, in each of the embodiments of the compliant link 300 of FIGS. 9, 10A, 10B, and the compliant link 340 of FIGS. 11, 12A, 12B, the longitudinal leaf spring resilient beam 320, 345, and at least one arm 321, 341, 342 extending laterally of the longitudinal beam, tend to flex the longitudinal beam, and to serve as a resilient beam both for the application of a compression force and for the application of a tension force. Additionally, the compliant link 300, 340 serves as a drag link to move the coupled moveable member.

Preferably, the compliant link longitudinal leaf spring resilient beam and at least one arm comprise a single piece. Thus, in each case, the compliant link 300, 340, comprises, for compliant link 300, a single piece longitudinal leaf spring resilient beam 320 and arm 321, and, comprises, for compliant link 340, a single piece longitudinal leaf spring resilient beam 345, and arms 341, 342. Also preferably, the single piece longitudinal leaf spring resilient beam and laterally extending arm(s) comprises a resilient plastic having a long fatigue life, such as a "liquid crystal" plastic. Examples of a resilient plastic are "Valox" and "Delrin", both manufactured by General Electric.

The single piece offers the advantage of being manufacturable by molding, which results in a low cost.

Alternatively, the compliant link longitudinal leaf spring resilient beam and at least one arm may comprise two pieces that are joined at the resilient beam, for example, by means of a clamp. Also, the coupling axes may comprise bearings which are separate pieces.

As pointed out above, cartridge loading apparatus is typically expected to properly position the cartridge, and to provide the necessary pressure to properly place and hold the cartridge in the loaded position. Loading mechanisms for automated data storage libraries have the additional need to withstand impacts and pushing or pulling actions by the mechanism providing the cartridge to the loader.

Hence, in accordance with one aspect of the present invention, the compliant link 300, 340 provides both tension and compression resilience, allowing a less complex cartridge loading apparatus that both provides a needed loading force and is able to withstand impacts and pushing or pulling actions by the mechanism providing the cartridge to the loader. Although the compliant linkage illustrated in the following figures is compliant link 300, compliant link 340 may be substituted therefor, as is known to those of skill in the art.

Referring to FIGS. 5 and 6, when the receiver 103 is in the "insert" position toward the front opening 120 of the cartridge loading apparatus, the symmetrically located compliant links 300 have moved the arms 185 toward the front opening. Additionally referring to FIGS. 2 and 4, slots 195 pull guide 192 down, away from the receiver 103. Each engagement pin 301 and 302 is located on the same shaft as a guide 192, on the opposite side of arm 190, and protrudes toward the interior of the receiver 103. Thus, as the guide 192 is pulled down by slot 195, the engagement pins 301, 302 are also pulled down, out of the interior of the receiver 103. This allows a portable data storage cartridge to be inserted into or withdrawn from the receiver.

When a cartridge is inserted into the receiver, the compliant links 300, and the alternative compliant links 340, serve as compression springs to maintain the position of the receiver and absorb the force of the mechanism (or manual force) inserting the cartridge.

Additionally, once inserted in the receiver, external forces may be applied to the receiver or cartridge which are also compensated for by the compliant links 300.

As discussed in the incorporated '030 Patent Application, a sensor detects the insertion of a cartridge into the receiver, and enables motor 180 of FIG. 4 to operate through gear train 181 to rotate bell crank 182 away from the front, and toward the rear, of the cartridge loading apparatus 100.

Referring additionally to FIGS. 7 and 8, in accordance with the present invention, the rotation of bell crank 182 thus pulls the compliant links 300 toward the rear of the cartridge loading apparatus, which pulls arms 185 of receiver 103, and therefore the receiver 103, towards the rear of the cartridge loading apparatus. As the receiver 103 is pulled toward the rear of the cartridge loading apparatus, slots 195 elevate guides 192 up, toward the receiver 103, such that the engagement pins 301, 302 are elevated into the receiver 103, where they engage the portable cartridge 40 of FIG. 1 at notches 58. As pointed out in the incorporated '030 Patent Application, as the receiver continues to be pulled toward the rear of the cartridge loading apparatus, the engagement pins 301, 302 exert a force on the portable cartridge 40 normal to the facing surface 140 of the circuitized flexible substrate 136. First, the alignment pins 165 and 166 engage corresponding holes 55 and 56 of the cartridge to orient the portable cartridge substrate and gradually laterally align the portable cartridge substrate and the circuitized flexible substrate 136, registering the cartridge substrate electrical contacts 51 in face-to-face relation with the circuitized flexible substrate electrical contacts. Then the engagement pins exert the normal force on the portable cartridge and cause the portable cartridge substrate 50 to compress an elastomeric compression element to create non-wiping contact between the electrical contacts 51 of the portable cartridge substrate 50 and the electrical contacts of the circuitized flexible substrate 136.

As an example, the force generated by the loader may comprise a total normal force greater than 10 pounds on the cartridge, and compresses the compression element a depth of about 0.022 inches.

The compliant links 300 serve as drag links to move the cartridge and receiver, and serve as tension springs to maintain an even force on the cartridge, compensating for tolerance buildup or misalignments of the mechanism or of the cartridge.

Additionally, once loaded, and during operation, external forces may be applied to the cartridge which are also compensated for by the compliant links 300, and by the alternative compliant links 340.

Figure 13:
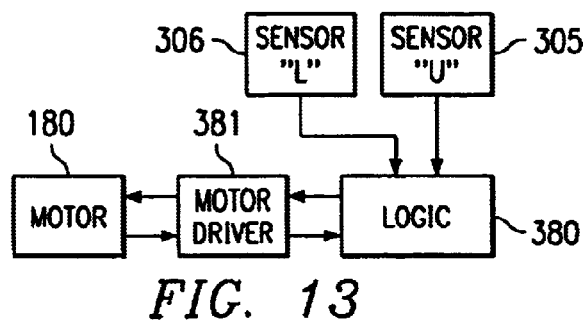
FIG. 13 is a block diagram illustrating the sensors of FIG. 3 arranged in a circuit which controls functions of the motor of the cartridge loading apparatus of FIG. 2.

FIG. 13 illustrates the sensors 305 and 306 of FIG. 3 arranged in a circuit which controls functions of the motor 180 of the cartridge loading apparatus of FIG. 2, and FIGS. 14–19 illustrate the progression of movement of the complaint linkage and rotatable mechanism of the cartridge loading apparatus of FIG. 2 from an unloaded and over-center position, to a centered and not over-center position, to substantially the center of travel between an unloaded position and a loaded position, to a loaded and centered and not over-center position, to a loaded and over-center position.

As discussed above, and referring to FIG. 19, the cartridge 40, once properly positioned, should be restrained and held in the fully loaded position. In accordance with an aspect of the present invention, the tension force of the compliant links 300 of the cartridge loading apparatus tends to lock an engaged cartridge at the fully loaded position.

Specifically, bell crank 182 is rotated until compliant link 300 contacts a stop 360 at the pivot end of the bell crank 182, such that the compliant link 300 is pressed against the stop when in the fully loaded over-center position.

The "loaded" limit stop limits movement of the cartridge loading apparatus at the over-center position of the rotatable mechanism, such that a compression relationship is provided between the receptacle and an engaged fully loaded cartridge 40, which generates a tension force on the compliant link 300 and tends to force the cartridge loading apparatus against the "loaded" limit stop, thereby tending to lock the bell crank 182 under pressure, and, also, provides the normal force to the cartridge 40 to hold the cartridge in position.

In an alternative embodiment, referring to FIG. 4, the "loaded" limit stop comprises stop 193, which is contacted by the bell crank 182.

As an example, the over-center position of the bell crank 182 is substantially 10 degrees beyond "top dead center" as is known to those of skill in the art.

As is apparent to those of skill in the art, a stop 360, and an alternative stop 193, are provided at one side of the mechanism only, and the motion stopped at the opposite side of the mechanism by cross shaft 370. Alternatively, stops 360 and alternative stops 193 are symmetrically located on opposite sides of the mechanism so as to lock the symmetrically located bell cranks 182 and compliant links 300.

As discussed above, and referring to FIGS. 4 and 14–15, the receiver 103 for the cartridge 40 should be held in the eject position for unloading the cartridge, and the receiver for the cartridge should be restrained to prevent creep after unloading, so that it is in the precise correct position to accept a cartridge being delivered by the delivering mechanism.

In accordance with an aspect of the present invention, the compression force of the compliant links 300 of the cartridge loading apparatus tends to lock the receiver for a cartridge at the eject or fully unloaded position.

Specifically, guides 186 and 187 of the arms 185, which ride in slots 188 and 189 of the cartridge loading apparatus and movably support the receiver 103 as it moves forward and backwards, are positioned against the ends of the respective slots by the compression force of the respective compliant links 300, the ends of the slots comprising an end of motion limiter for the arms 185, and, therefore, the receiver 103.

Additionally, "unloaded" limit stops 368 are provided. When in the fully unloaded position, and in a second over-center position, the bell cranks 182 contact the "unloaded" limit stops 368, limiting movement of the cartridge loading apparatus at the second over-center position. As the result of the force between the end of motion limiter, comprising the slots 188 and 189 and the guides 186 and 187, a compression force is generated on the compliant link 300 which tends to force the cartridge loading apparatus against the "unloaded" limit stop 368, thereby tending to lock the bell crank 182 under pressure, and, also, provides the force to the arms 185 to hold the receiver 103 in position.

As an example, the over-center position of the bell cranks 182 is substantially 10 degrees beyond "top dead center" as is known to those of skill in the art.

As is apparent to those of skill in the art, a stop 368 is provided at one side of the mechanism only, and the motion stopped at the opposite side of the mechanism by cross shaft 370. Alternatively, stops 368 are symmetrically located so as to lock the symmetrically located bell cranks 182 and compliant links 300.

Figure 16:
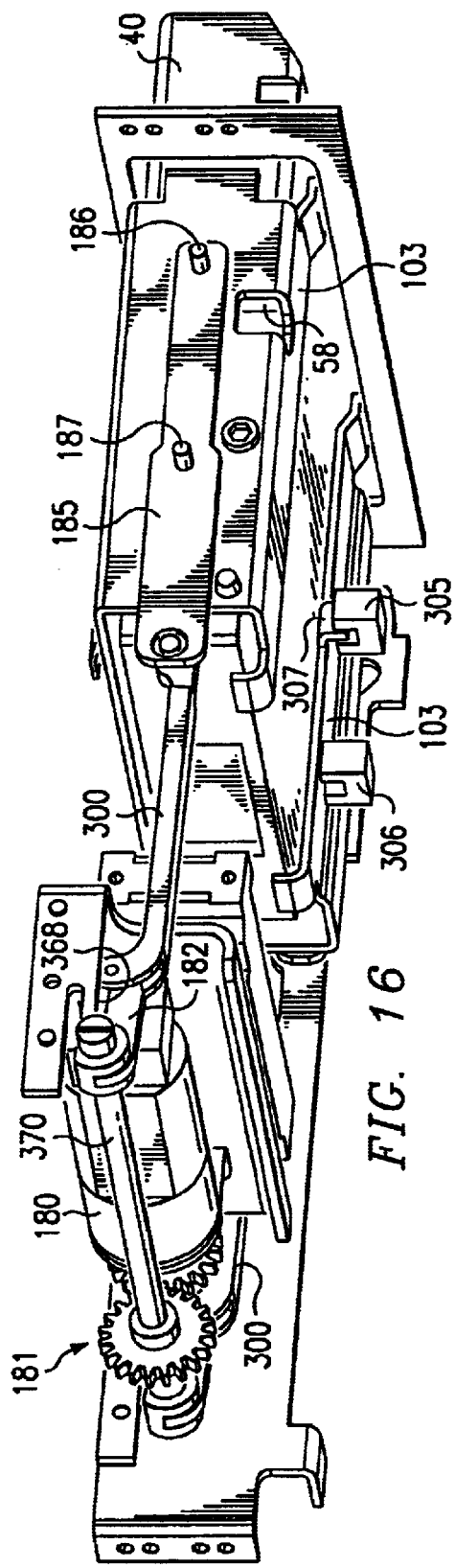
FIG. 16 is a lower isometric view illustrating the compliant linkage and rotatable mechanism of the cartridge loading apparatus of FIG. 2 in an unloaded position, and in a centered and not over-center position.

The operation of the motor 180 to place the cartridge loading apparatus in the respective over-center positions will now be discussed. Referring to FIGS. 3, 13 and 16, the motor 180 is moving the receiver to the eject or unloaded position. When the receiver is at the unloaded position, and the bell crank 182 is in the center of its transition and not over-center, tab 307 is detected by sensor 305, which provides a detection signal to logic 380. Logic 380 determines the direction of movement of the motor and, upon the detection of the tab 307, does not stop the motor, but, rather, provides a signal to a motor driver 381 to continue to operate to rotate the bell crank beyond the fully unloaded position to the second over-center position against "unloaded" limit stops 368, as depicted in FIGS. 14 and 15.

Figure 17:
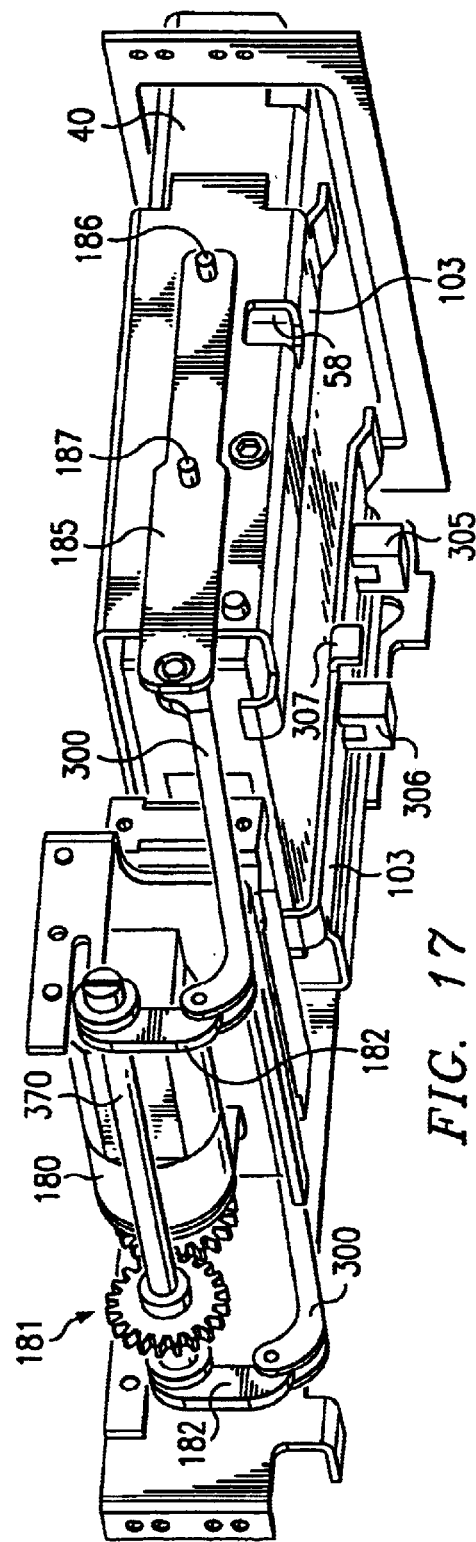
FIG. 17 is a lower isometric view illustrating the compliant linkage and rotatable mechanism of the cartridge loading apparatus of FIG. 2 at substantially the center of travel between an unloaded position and a loaded position.

The motor 180 is reversible, and logic 180, upon insertion of a cartridge 40 in the receiver 103, and upon the availability of the receptacle 130 for a cartridge, operates the motor to move the bell cranks 182 away from the "unloaded" limit stops 368, as depicted in FIGS. 14 and 15, back over the center position, as depicted in FIG. 16, toward the rear of the cartridge loading apparatus 100 and toward the receptacle 130. As shown in FIGS. 2 and 4, pins 301 and 302 then move upwards in slots 195 to engage the cartridge 40 of FIG. 1 at slots 58, and move the cartridge and receiver 103 towards the receptacle 130. In FIG. 17, the receiver has been moved to the midpoint, and tab 107 is no longer detected by sensor 305. This indicates to logic 380 of FIG. 13 that the receiver is moving properly towards the loaded position.

Figure 18:
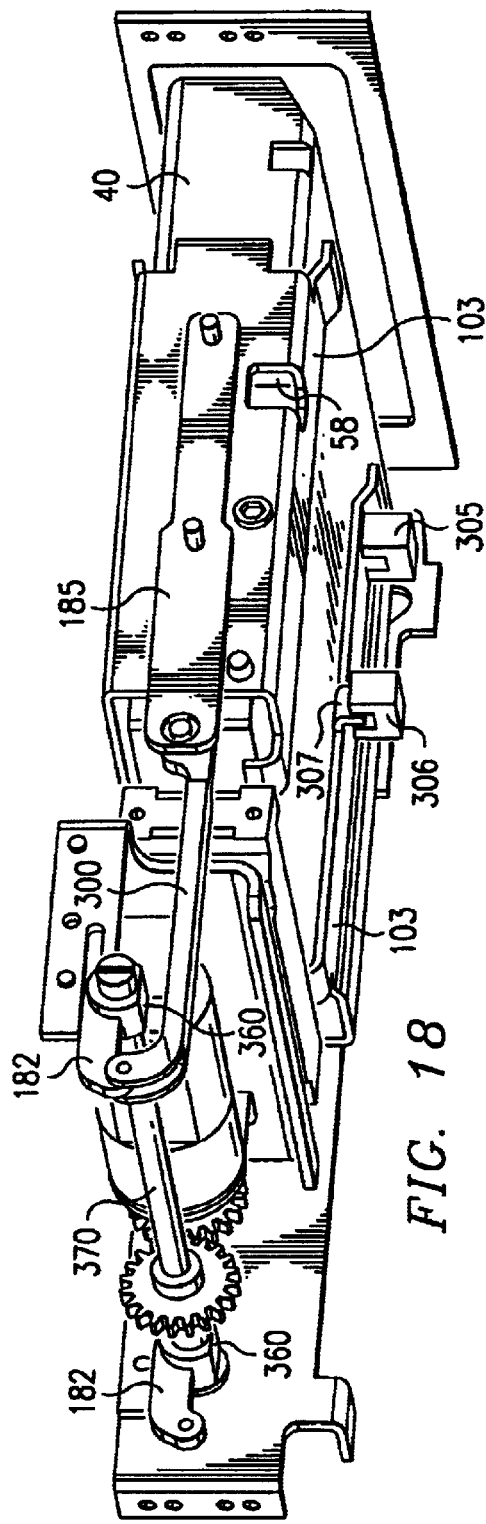
FIG. 18 is a lower isometric view illustrating the compliant linkage and rotatable mechanism of the cartridge loading apparatus of FIG. 2 in a loaded position, and in a centered and not over-center position.
Figure 19:
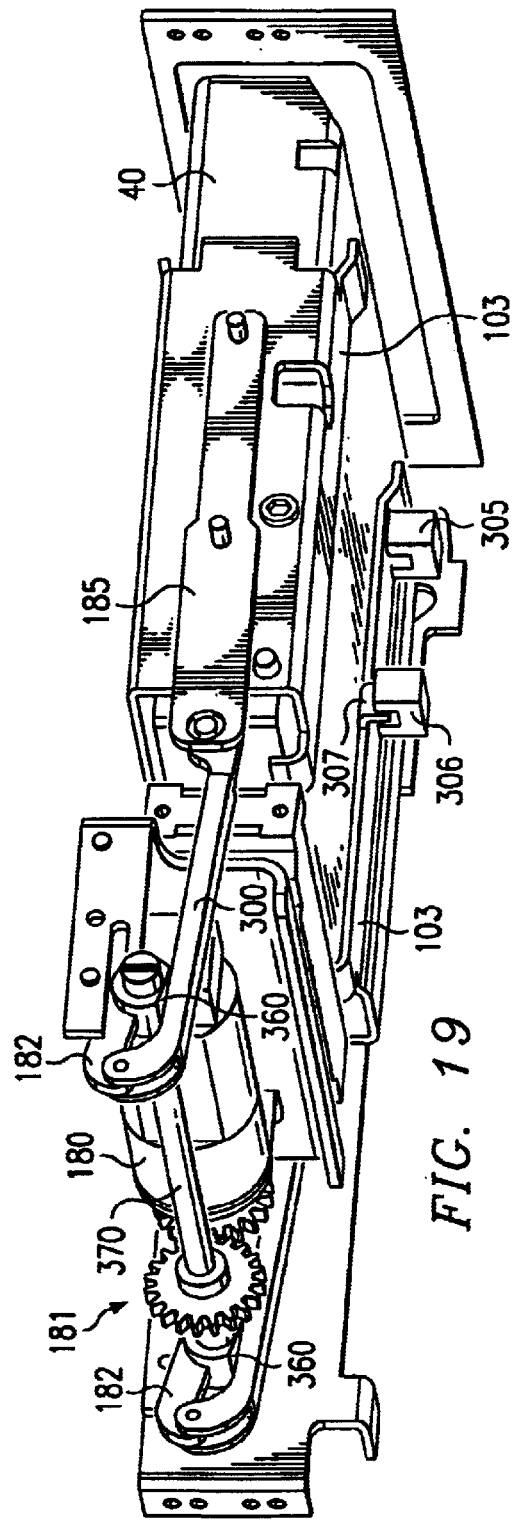
FIG. 19 is a lower isometric view illustrating the compliant linkage and rotatable mechanism of the cartridge loading apparatus of FIG. 2 in a loaded and over-center position.

Referring to FIG. 18, the receiver is at the fully loaded position, and the bell crank 182 is in the center of its transition and not over-center. When in this position, tab 307 is detected by sensor 306, which provides a detection signal to logic 380. Logic 380 determines the direction of movement of the motor and, upon the detection of the tab 307, does not stop the motor, but, rather, provides a signal to a motor driver 381 to continue to operate to rotate the bell crank beyond the fully loaded position to the over-center position against the "loaded" limit stops 360, as depicted in FIG. 19.

In releasing and unloading the cartridge, the logic 380 operates the motor 180 to rotate back over center and then towards the front opening 120 of the cartridge loading apparatus.

Again, alternative loaded limit stops 193 may be employed.

As is known to those of skill in the art, alternative logic, alternative motor arrangements, alternative limit stops, alternative sensors, and alternative receivers and loading mechanisms may be employed with the compliant links 300, 340 of the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a cartridge loading apparatus which comprises at least one movable member for moving an engaged cartridge, and a reversible motor apparatus, a compliant linkage comprising:
    at least one compliant link comprising:
        a longitudinal leaf spring resilient beam; and
        an arm extending laterally of said longitudinal beam in a direction such that rotational torque at said laterally extending arm tends to flex said longitudinal beam, said laterally extending arm positioned towards a first end of said beam;
        said longitudinal beam having a coupling axis toward a second end of said longitudinal beam opposite said first end; and
        said laterally extending arm having a coupling axis spaced from said longitudinal beam, said beam coupling axis and said arm coupling axis parallel to each other and perpendicular to a plane formed by said longitudinal beam and said laterally extending arm, said compliant link coupled to said movable member and to said reversible motor apparatus at respective said coupling axes;
    whereby application of a compression force to said compliant linkage provides said rotational torque at said laterally extending arm tending to reduce the distance between said coupling axes and to flex said longitudinal beam outwardly in a direction away from a straight line between said coupling axes; and application of a tension force to said compliant linkage provides said rotational torque at said laterally extending arm tending to increase the distance between said coupling axes and to flex said longitudinal beam inwardly in a direction towards a straight line between said coupling axes.

2. The compliant linkage of claim 1, wherein said cartridge loading apparatus additionally comprises dual sets of said at least one movable member for moving an engaged cartridge, and said compliant linkage comprising two said compliant links disposed in a symmetrical relationship, each coupled to one of said dual sets of at least one movable member and each coupled to said reversible motor apparatus, each at said respective coupling axes.

3. The compliant linkage of claim 1, wherein said longitudinal leaf spring resilient beam and said laterally extending arm comprise a single piece.

4. The compliant linkage of claim 1, wherein said compliant link longitudinal beam tends to flex in said plane formed by said longitudinal beam and said laterally extending arm upon application of said rotational torque at said laterally extending arm, and wherein said plane formed by said longitudinal beam and said laterally extending arm is parallel to a direction of motion of said at least one movable member for moving an engaged cartridge.

5. In a cartridge loading apparatus which comprises at least one movable member for moving an engaged cartridge, and a reversible motor apparatus, a compliant linkage comprising:
    at least one compliant link comprising:
        a longitudinal leaf spring resilient beam;
        a first arm extending laterally of said longitudinal beam in a direction such that rotational torque at said laterally extending arm tends to flex said longitudinal beam, said longitudinal beam and said first laterally extending arm forming a plane in said direction of said rotational torque, said laterally extending arm positioned towards a first end of said beam; and a second arm extending laterally of said longitudinal beam in said plane formed by said longitudinal beam and said first laterally extending arm, and in a direction such that rotational torque at said laterally extending arm tends to flex said longitudinal beam, said second laterally extending arm positioned towards a second end of said longitudinal beam opposite said first end, said first laterally extending arm having a coupling axis spaced from said longitudinal beam, and said second laterally extending arm having a coupling axis spaced from said longitudinal beam, said arm coupling axes parallel to each other and perpendicular to said plane formed by said longitudinal beam and said laterally extending arms, said compliant link coupled to said movable member and to said reversible motor apparatus at respective said coupling axes;

whereby application of a compression force to said compliant linkage provides said rotational torque at said laterally extending arms tending to reduce the distance between said coupling axes and to flex said longitudinal beam outwardly in a direction away from a straight line between said coupling axes; and application of a tension force to said compliant linkage provides said rotational torque at said laterally extending arms tending to increase the distance between said coupling axes and to flex said longitudinal beam inwardly in a direction towards a straight line between said coupling axes.

6. The compliant linkage of claim 5, wherein said cartridge loading apparatus additionally comprises dual sets of said at least one movable member for moving an engaged cartridge, and said compliant linkage comprising two said compliant links disposed in a symmetrical relationship, each coupled to one of said dual sets of at least one movable member and each coupled to said reversible motor apparatus, each at said respective coupling axes.

7. The compliant linkage of claim 5, wherein said longitudinal leaf spring resilient beam and said first and said second laterally extending arms comprise a single piece.

8. The compliant linkage of claim 5, wherein said compliant link longitudinal beam tends to flex in said plane formed by said longitudinal beam and said first and said second laterally extending arms upon application of said rotational torque at said laterally extending arm, and wherein said plane formed by said longitudinal beam and said first and said second laterally extending arms is parallel to a direction of motion of said at least one movable member for moving an engaged cartridge.

9. A cartridge loading apparatus operated by a reversible motor apparatus, comprising:

at least one movable member for moving an engaged cartridge; and at least one compliant link comprising:
a longitudinal leaf spring resilient beam; and
an arm extending laterally of said longitudinal beam in a direction such that rotational torque at said laterally extending arm tends to flex said longitudinal beam, said laterally extending arm positioned towards a first end of said beam, said longitudinal beam having a coupling axis toward a second end of said longitudinal beam opposite said first end, and said laterally extending arm having a coupling axis spaced from said longitudinal beam, said beam coupling axis and said arm coupling axis parallel to each other and perpendicular to a plane formed by said longitudinal beam and said laterally extending arm, said compliant link coupled to said movable member and to said reversible motor apparatus at respective said coupling axes;

whereby application of a compression force to said compliant link provides said rotational torque at said laterally extending arm tending to reduce the distance between said coupling axes and to flex said longitudinal beam outwardly in a direction away from a straight line between said coupling axes; and application of a tension force to said compliant link provides said rotational torque at said laterally extending arm tending to increase the distance between said coupling axes and to flex said longitudinal beam inwardly in a direction towards a straight line between said coupling axes.

10. The cartridge loading apparatus of claim 9, additionally comprising:

a second said at least one movable member, said first and said second at least one movable member comprising dual sets of said at least one moveable member, for moving an engaged cartridge; and a second said compliant link, said compliant links disposed in a symmetrical relationship, each coupled to one of said dual sets of at least one movable member and each coupled to said reversible motor apparatus, each at said respective coupling axes.

11. The cartridge loading apparatus of claim 9, wherein said compliant link longitudinal leaf spring resilient beam and said laterally extending arm comprise a single piece.

12. The cartridge loading apparatus of claim 9, wherein said compliant link longitudinal beam tends to flex in said plane formed by said longitudinal beam and said laterally extending arm upon application of said rotational torque at said laterally extending arm, and wherein said plane formed by said longitudinal beam and said laterally extending arm is parallel to a direction of motion of said at least one movable member for moving an engaged cartridge.

13. A cartridge loading apparatus operated by a reversible motor apparatus and moving a cartridge to and away from a receptacle, comprising:

at least one movable member for moving an engaged cartridge;

a rotatable mechanism coupled to said reversible motor apparatus; and at least one compliant link comprising:
a longitudinal leaf spring resilient beam; and
an arm extending laterally of said longitudinal beam in a direction such that rotational torque at said laterally extending arm tends to flex said longitudinal beam, said laterally extending arm positioned towards a first end of said beam, said longitudinal beam having a coupling axis toward a second end of said longitudinal beam opposite said first end, and said laterally extending arm having a coupling axis spaced from said longitudinal beam, said beam coupling axis and said arm coupling axis parallel to each other and perpendicular to a plane formed by said longitudinal beam and said laterally extending arm, said compliant link coupled to said movable member and to said rotatable mechanism apparatus at respective said coupling axes;

whereby application of a compression force to said compliant link provides said rotational torque at said laterally extending arm tending to reduce the distance between said coupling axes and to flex said longitudinal beam outwardly in a direction away from a straight line between said coupling axes; and application of a tension force to said compliant link provides said rotational torque at said laterally extending arm tending to increase the distance between said coupling axes and to flex said longitudinal beam inwardly in a direction towards a straight line between said coupling axes; and said reversible motor apparatus operates said rotatable mechanism to move said compliant link and thereby said at least one movable member and any engaged cartridge to and away from said receptacle.

14. The cartridge loading apparatus of claim 13, wherein said rotatable mechanism may rotate to an over-center position which is beyond the point at which said least one movable member and said at least one compliant link are moved to a fully loaded position at which an engaged cartridge is fully loaded at said receptacle, and wherein said rotatable mechanism additionally comprises at least one "loaded" limit stop, said limit stop limiting movement of said cartridge loading apparatus at said over-center position of said rotatable mechanism, whereby a compression relationship between said receptacle and an engaged, fully loaded cartridge, generates a tension force on said compliant link and tends to force said cartridge loading apparatus against said at least one "loaded" limit stop, thereby tending to lock said engaged cartridge at said fully loaded position.

15. The cartridge loading apparatus of claim 14, additionally comprising an end of motion sensor apparatus for detecting when said least one movable member and said at least one compliant link are moved to a fully loaded position at which an engaged cartridge is fully loaded, said end of motion sensor coupled to said reversible motor apparatus, said reversible motor apparatus continuing to operate on a limited basis to move said cartridge loading apparatus to said over-center position, whereby, moving through said fully loaded position to said over-center position, provides application of said tension force to said compliant link.

16. The cartridge loading apparatus of claim 15, wherein said at least one "loaded" limit stop comprises a point at which said compliant link contacts said rotatable mechanism, when said rotatable mechanism is in said over-center position.

17. The cartridge loading apparatus of claim 13, wherein:
said rotatable mechanism may rotate to an second over-center position which is beyond the point at which said at least one movable member and said at least one compliant link are moved to a fully unloaded position; and wherein said cartridge loading apparatus additionally comprises an end of motion limiter for said at least one movable member; and additionally comprises at least one "unloaded" limit stop, said "unloaded" limit stop limiting movement of said cartridge loading apparatus at said second over-center position of said rotatable mechanism, whereby movement of said at least one movable member against said end of motion limiter generates a compression force on said compliant link and tends to force said cartridge loading apparatus against said at least one "unloaded " limit stop, thereby tending to lock said at least one movable member at said fully unloaded position.

18. The cartridge loading apparatus of claim 17, additionally comprising an end of motion sensor apparatus for detecting when said least one movable member and said at least one compliant link are moved to a fully unloaded position, said end of motion sensor coupled to said reversible motor apparatus, said reversible motor apparatus continuing to operate on a limited basis to move said cartridge loading apparatus to said second over-center position, whereby, moving through said fully unloaded position to said over-center position, provides application of said compression force to said compliant link.

19. A compliant link for a cartridge loading apparatus which comprises at least one movable member for moving an engaged cartridge, and a reversible motor apparatus, comprising:

a longitudinal leaf spring resilient beam; and an arm extending laterally of said longitudinal beam in a direction such that rotational torque at said laterally extending arm tends to flex said longitudinal beam, said laterally extending arm positioned towards a first end of said beam;

said longitudinal beam having a coupling axis toward a second end of said longitudinal beam opposite said first end; and said laterally extending arm having a coupling axis spaced from said longitudinal beam, said beam coupling axis and said arm coupling axis parallel to each other and perpendicular to a plane formed by said longitudinal beam and said laterally extending arm, said compliant link coupled to said movable member and to said reversible motor apparatus at respective said coupling axes;

whereby application of a compression force to said compliant linkage provides said rotational torque at said laterally extending arm tending to reduce the distance between said coupling axes and to flex said longitudinal beam outwardly in a direction away from a straight line between said coupling axes; and application of a tension force to said compliant linkage provides said rotational torque at said laterally extending arm tending to increase the distance between said coupling axes and to flex said longitudinal beam inwardly in a direction towards a straight line between said coupling axes;

wherein said longitudinal leaf spring resilient beam and said laterally extending arm comprise a single piece.

20. The compliant link of claim 19, wherein said compliant link longitudinal beam tends to flex in said plane formed by said longitudinal beam and said laterally extending arm upon application of said rotational torque at said laterally extending arm, and wherein said plane formed by said longitudinal beam and said laterally extending arm is parallel to a direction of motion of said at least one movable member for moving an engaged cartridge.

21. The compliant link of claim 19, wherein said single piece longitudinal leaf spring resilient beam and laterally extending arm comprises a resilient plastic having a long fatigue life.

22. The compliant link of claim 21, wherein said resilient plastic longitudinal leaf spring resilient beam and laterally extending arm comprises a "liquid crystal" plastic.

23. A compliant link for a cartridge loading apparatus which comprises at least one movable member for moving an engaged cartridge, and a reversible motor apparatus, comprising:

a longitudinal leaf spring resilient beam;

a first arm extending laterally of said longitudinal beam in a direction such that rotational torque at said laterally extending arm tends to flex said longitudinal beam, said longitudinal beam and said first laterally extending arm forming a plane in said direction of said rotational torque, said laterally extending arm positioned towards a first end of said beam; and a second arm extending laterally of said longitudinal beam in said plane formed by said longitudinal beam and said first laterally extending arm, and in a direction such that rotational torque at said laterally extending arm tends to flex said longitudinal beam, said second laterally extending arm positioned towards a second end of said longitudinal beam opposite said first end, said first laterally extending arm having a coupling axis spaced from said longitudinal beam, and said second laterally extending arm having a coupling axis spaced from said longitudinal beam, said arm coupling axes parallel to each other and perpendicular to said plane formed by said longitudinal beam and said laterally extending arms, said compliant link coupled to said movable member and to said reversible motor apparatus at respective said coupling axes;

whereby application of a compression force to said compliant linkage provides said rotational torque at said laterally extending arms tending to reduce the distance between said coupling axes and to flex said longitudinal beam outwardly in a direction away from a straight line between said coupling axes;

and application of a tension force to said compliant linkage provides said rotational torque at said laterally extending arms tending to increase the distance between said coupling axes and to flex said longitudinal beam inwardly in a direction towards a straight line between said coupling axes.

24. The compliant link of claim 23, wherein said compliant link longitudinal beam tends to flex in said plane formed by said longitudinal beam and said laterally extending arms upon application of said rotational torque at said laterally extending arms, and wherein said plane formed by said longitudinal beam and said laterally extending arms is parallel to a direction of motion of said at least one movable member for moving an engaged cartridge.

25. The compliant link of claim 23, wherein said single piece longitudinal leaf spring resilient beam and laterally extending arms comprises a resilient plastic having a long fatigue life.

26. The compliant link of claim 25, wherein said resilient plastic longitudinal leaf spring resilient beam and laterally extending arms comprises a "liquid crystal" plastic.

* * * * *